United States Patent [19]

Hill

[11] Patent Number: 4,838,514

[45] Date of Patent: Jun. 13, 1989

[54] VEHICLE SEAT

[75] Inventor: Kevin E. Hill, Milwaukee, Wis.

[73] Assignee: Milsco Manufacturing Company, Milwaukee, Wis.

[21] Appl. No.: 201,945

[22] Filed: Jun. 3, 1988

[51] Int. Cl.$^4$ .......................................... F16M 13/00
[52] U.S. Cl. ................... 248/577; 248/602; 248/610; 248/624; 297/308; 297/345
[58] Field of Search ............ 248/577, 576, 575, 581, 248/602, 610, 162.1, 624, 564; 297/307, 308, 345

[56] References Cited

U.S. PATENT DOCUMENTS

| 3,326,603 | 6/1967 | Lehner | 297/308 |
|---|---|---|---|
| 3,442,552 | 5/1969 | Lehner | 297/307 X |
| 3,480,324 | 11/1969 | Bauer et al. | 297/308 |
| 3,572,828 | 3/1971 | Lehner | 248/575 X |
| 3,705,745 | 12/1972 | Ambrosius | 297/308 |
| 3,861,637 | 1/1975 | DeLongchamp | 248/576 |
| 4,186,963 | 2/1980 | Koutsky | 248/576 X |
| 4,662,597 | 5/1987 | Uecker et al. | 297/307 X |

FOREIGN PATENT DOCUMENTS

| 2004147 | 11/1969 | France | 297/307 |
|---|---|---|---|
| 35028 | 3/1977 | Japan | 297/308 |
| 659427 | 4/1979 | U.S.S.R. | 248/575 |

Primary Examiner—J. Franklin Foss
Assistant Examiner—David L. Talbott
Attorney, Agent, or Firm—James E. Nilles; Thomas F. Kirby

[57] ABSTRACT

A vehicle seat frame assembly comprises a stationary support frame having two laterally spaced-apart side support plates attachable to a vehicle and on which is mounted a vertically movable seat frame which comprises a horizontal seat portion and a vertical backrest portion. An upper rod is horizontally supported in slots formed in the upper ends of the side support plates. Rotatable rollers attached to opposite ends of the rod are engaged in roller guide boxes which are rigidly secured to the lateral sides of the seat frame backrest portion to guide and support the seat frame. An elongated swing arm is pivotally connected at its rear end and at its front end to the lower end of the support frame and to the front end of the seat portion, respectively, to help support the seat frame. A spring shelf and a header plate are rigidly secured to the seat frame near the lower and upper ends, respectively, of the backrest portion. A vertically disposed spring tension adjustment rod is rotatably mounted in holes provided in the spring shelf and header plate and its threaded lower end threadedly engages and supports a spring hanger. A pair of helical tension springs resiliently supports the seat frame on the support frame. Each spring has its upper and lower ends hooked to the upper rod on the support frame and to the spring hanger, respectively. Manual rotation of the tension adjustment rod moves the spring hanger to load or relax the springs. A spring damper in the form of an extendable/retractable shock absorber has its lower and upper ends pivotally connected to the rear end of the swing arm and to an anchor bracket on the seat frame backrest portion, respectively.

8 Claims, 4 Drawing Sheets

VEHICLE SEAT

Background of the Invention

1. Field of Use

This invention relates to seats for installation on motor vehicles, such as backhoes, tractors or other types of construction machinery.

In particular, it relates to a vehicle seat having improved suspension means and improved suspension means.

2. Description of the Prior Art

Vehicles of the aforesaid character frequently operate on rough terrain, and typically have a seat for the vehicle operator/driver which includes resilient suspension means so as to reduce road shock. This enables the operator/driver to have better control of the vehicle and also reduces operator fatigue. Typically, the resiliency of the suspension means is selectively adjustable to take into account vehicle operators of different weights and thereby minimize road shock effects on each individual operator.

The prior art discloses a wide variety of vehicle seats employing suspension means and suspension adjustment means. The following U.S. patents, assigned to the same assignee as the present application, illustrate the state of the art: U.S. Pat. Nos. 4,593,875; 4,561,621; 4,533,110; 4,072,287.

Commercially available prior art vehicle seats of the aforesaid character have become highly refined, mechanically complex and relatively costly to manufacture and service. It is desirable, therefore, to provide an improved vehicle seat which overcomes the aforementioned drawbacks and has other advantages.

SUMMARY OF THE PRESENT INVENTION

The present invention provides an improved seat which can be mounted either directly on a vehicle or, if preferred, on a seat pedestal on the vehicle. A typical pedestal enables the seat to be raised and lowered relative to the vehicle, or rotated about a vertical axis, or adjustably positioned fore and aft relative to the vehicle, or any combination of these functions.

The improved seat comprises a frame assembly including a stationary support frame for rigid attachment to the vehicle (or pedestal) and a seat frame for the seat occupant. Means are provided for mounting the seat frame on the support frame to enable the seat frame to move vertically upwardly and downwardly relative to the support frame. Suspension springs are provided to bias the seat frame upwardly relative to the support frame so as to compensate for the weight of the seat occupant and absorb road shocks. Spring damping means are provided in parallel with the suspension springs. Spring tension adjustment means are provided to adjust the resiliency of the suspension springs to accommodate the weight of a particular seat occupant and/or adjust the quality of the ride, i.e., hard or soft.

The stationary support frame has a lower end and an upper end. The movable seat frame has a generally horizontal seat portion and a generally vertical backrest portion. The seat portion has a rear end and a front end. The brackset portion has a lower end and an upper end. Means are provided for mounting the seat frame on the support frame to enable the seat frame to move generally vertically relative to the support frame in response to forces imposed on the seat frame by road shocks or the weight of a seat occupant. Such means comprise a roller on the support frame which is engaged with a roller guide on the seat frame. Such means further comprise an elongated swing are having a front end pivotally connected to the front end of the seat portion and having a rear end pivotally connected to the lower end of the support frame. A pair of helical tension springs are provided for biasing the seat frame upwardly relative to the support frame. First means are provided for connecting the upper end of the springs to the support frame near the upper end thereof. Second means are provided for connecting the lower end of the springs to said seat frame near the rear end of said seat portion. Extendable/retractable spring damping means are provided in the form of a shock absorber having its lower end pivotally connected to the swing arm near the rear end thereof and having its upper end pivotally connected to the seat frame intermediately of the lower and upper ends of the backrest portion. The second means comprises a rod mounted on the seat frame and having a spring hanger mounted thereon engaged with the lower ends of the springs. The spring hanger is selectively movable axially to desired positions along the rod to thereby adjust the tension on the springs. In particular, the rod is manually rotatable about its longitudinal axis and has a threaded portion threadedly engaged in a threaded bore in the spring hanger so that rotation of the rod effects axial movement of said spring hanger and tension adjustment of the springs.

An improved vehicle seat in accordance with the present invention provides several advantages over the prior art. For example, the frame assembly is relatively simple in design, construction and mode of operation, yet provides road shock absorbing characteristics and weight adjustment capability equal to more complex prior art seat assemblies. It is extremely sturdy in construction, yet is relatively easy and economical to fabricate. The basic design of the frame assembly in such that various optional components and features can be applied thereto, such as seat tilt-adjustment controls, arm rests and so forth. Component parts of the frame assembly are fabricated from commercially available stock materials such as sheet metal plates, hollow tubes, angle iron, metal rods, coil springs, bearings and shock absorbers, rollers and other fittings, thereby substantially reducing the costs of parts and labor during manufacture. The adjustment means can be operated by an easily accessible manual control member, whether the operator is on or off of the seat.

Other objects and advantages of the invention will hereafter appear.

DRAWINGS

DESCRIPTION OF THE PREFERRED EMBODIMENT

Figure 1:
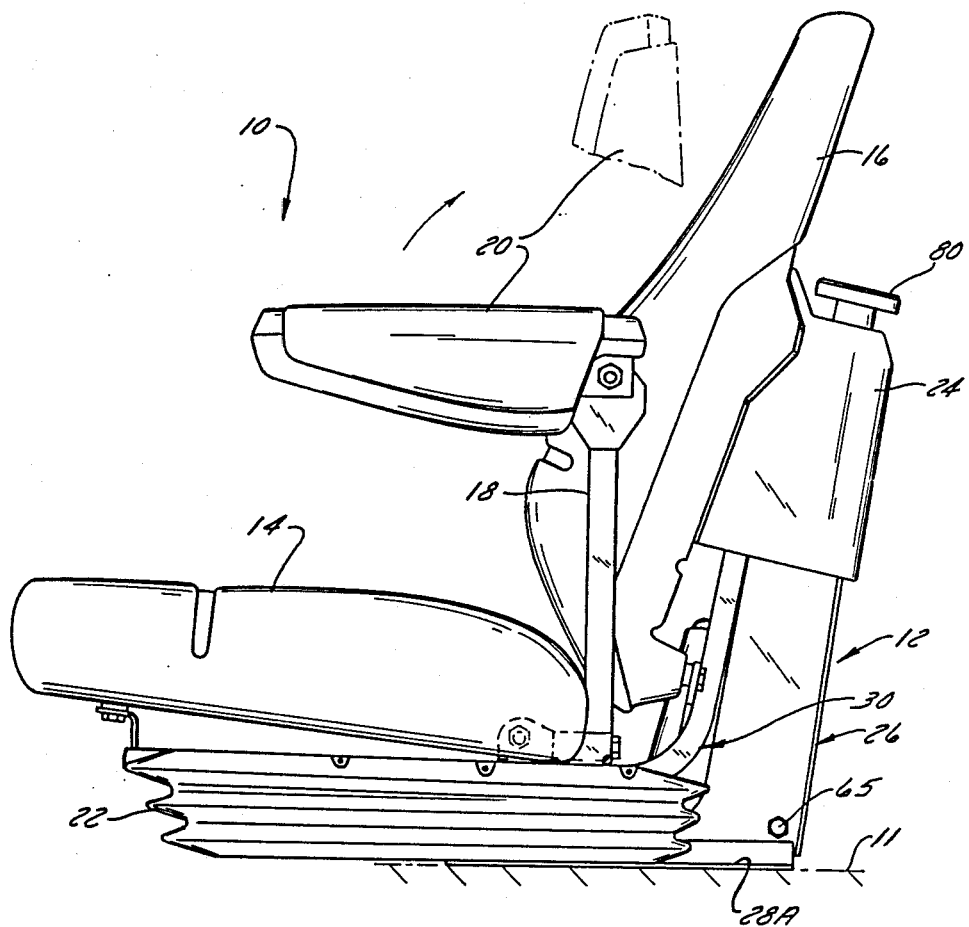
FIG. 1 is a side elevation view of the left side of a vehicle seat in accordance with the present invention.
Figure 2:
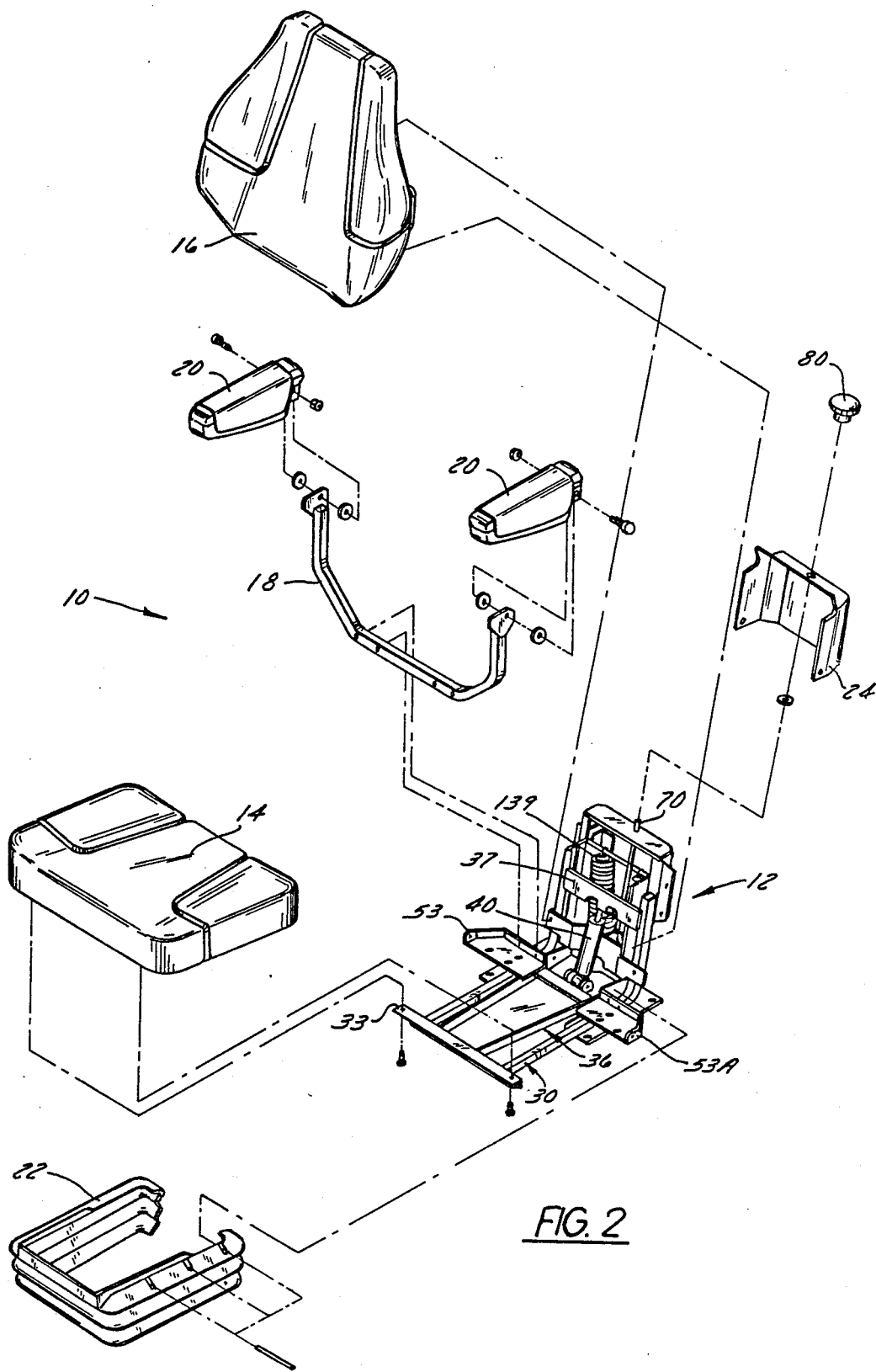
FIG. 2 is an exploded perspective view of the vehicle seat of FIG. 1 showing the frame assembly thereof and various components which are attachable to the frame assembly.

Referring to FIGS. 1 and 2, numeral 10 designates a vehicle seat in accordance with the present invention which is shown in FIG. 1 as mounted on the floor 11 of a vehicle (not shown). Seat 10 comprises a frame assembly 12, shown in FIG. 2, on which various components, shown in FIGS. 1 and 2, are mounted. The components include a seat cushion 14, a backrest cushion 16, an armrest support member 18, armrests 20, a flexible boot 22, and a mechanism cover 24.

Figure 3:
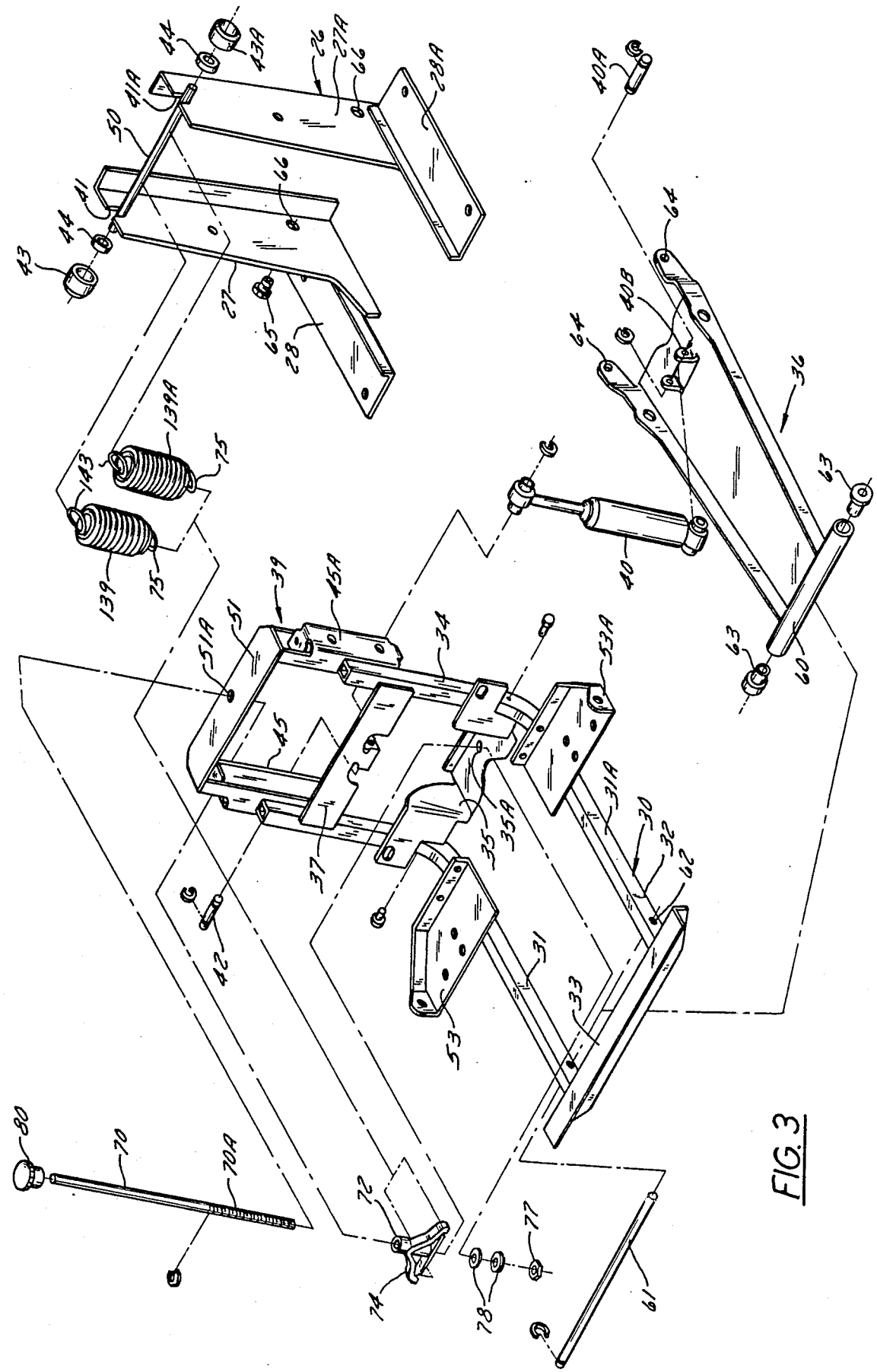
FIG. 3 is an enlarged exploded perspective view of the frame assembly shown in FIG. 2.

Referring to FIGS. 2 and 3, frame assembly 12 comprises a stationary support frame 26 attachable to vehicle floor 11 (FIG. 1) and a movable seat frame 30 which is mounted on support frame 26 and is movable vertically relative thereto in response to road shocks and the weight of the seat occupant. The cushions 14 and 16 and armrest support member 18, if used, and cover 24 are attachable to seat frame 30. Boot 22 is attachable between support frame 26 and seat frame 30.

Stationary support frame 26, which comprises two laterally spaced apart side support plates 27 and 27A, has a lower end and an upper end. The side plates 27 and 27A are welded to base plates 28 and 28A, respectively, which are adapted to be bolted to vehicle floor 11.

Movable seat frame 30 has a generally horizontal seat portion 32 and a generally vertical backrest portion 34. Seat portion 32 has a rear end and a front end. Backrest portion 34 has a lower end and an upper end. Seat frame 30 is fabricated of a pair of laterally spaced apart L-shaped tubular members 31 and 31A which are rigidly interconnected by an angle iron 33, a spring shelf 35, a damper support bracket 37 and a header assembly 39 which are welded to the members 31.

Angle iron 33 is located at the front end of seat frame 30. A pair of seat cushion support plates 53 and 53A are welded to frame members 31 and 31A at the rear end of seat frame 30 and, along with angle iron 33, serve to support seat cushion 14. Seat belts (now shown) are attachable to plates 53 and 53A.

Spring shelf 35, which has a hole 35A therethrough, is rigidly secured to seat frame 30 near the lower end of backrest portion 34.

Damper support bracket 37 is located intermediate the lower and upper ends of backrest portion 34 of seat frame 30.

Header assembly 39 is located at and rigidly secured to the upper end of backrest portion 34 of seat frame 30 and takes the form of a weldment including an upper plate 51 having a hole 51A therethrough and a pair of roller guide boxes 45 and 45A.

An elongated swing arm 36 is provided to help support seat frame 30 and has a front end pivotally connected to the front end of seat portion 32 and has a rear end pivotally connected to the lower end of support frame 26. Swing arm 36 is formed of stamped sheet metal and has a tube 60 which is supported in holes for accommodating a pivot shaft 61 which is supported in holes 62 (see FIG. 3) in the tubular members 31 and 31A. Flange bearings 63 support shaft 61 in tube 60. The rear end of swing arm 36 has holes 64 for accommodating shoulder bolts 65 which extend through holes 66 in the side support plates 27 and 27A of support frame 26 to pivotally support the swing arm thereon.

An extendable/retractable spring damping means in the form of an extendable/retractable shock absorber or spring damper 40 is provided and has a lower end pivotally connected by a pin 40A to a bracket 40B on swing arm 36 near the rear end thereof. Damper 40 has an upper end pivotally connected by a pin 42 to damper support bracket 37 on seat frame 30 intermediately of the lower and upper ends of backrest portion 34.

Means are provided for slidably connecting the upper end of backrest portion 34 of seat frame 30 to the upper end of support frame 26 to enable seat frame 30 to move generally vertically relative to support frame 26 in response to forces imposed on the seat frame by road shocks and the weight of a seat occupant. Thus, an elongated upper support rod 50 is horizontally supported in slots 41 and 41A formed in the upper ends of the side support plates 27 and 27A, respectively. Rotatable rollers 43 and 43A are attached to opposite ends of the rod 39 outside of the plates 27 and 27A. A hollow cylindrical roller spacer 44 is disposed on support rod 50 between each roller 43, 43A at its associated side plate 27, 27A, respectively. As above described, the roller guide boxes 45 and 45A are integral with header assembly 39 and are rigidly secured as by welding to the tubular members 31 and 31A, respectively. The boxes 45 and 45A are located at the rear of the lateral sides of backrest portion 34 of seat frame 30. The rollers 43 and 43A are engaged in the boxes 45 and 45A to guide and support movable seat frame 30.

Support rod 50 also provides support for a pair of helical tension springs 139 and 139A which are part of the suspension means and are located between the side plates 27 and 27A. Each spring has a hook 143 at its upper end by which it is hung from support rod 50. Thus, tension springs 139 and 139A are operatively connected to support frame 26 near the upper end thereof and have their lower ends operatively connected to backrest portion 34 of seat frame 30 near the rear end of seat frame 30, as hereinafter described.

Figure 4:
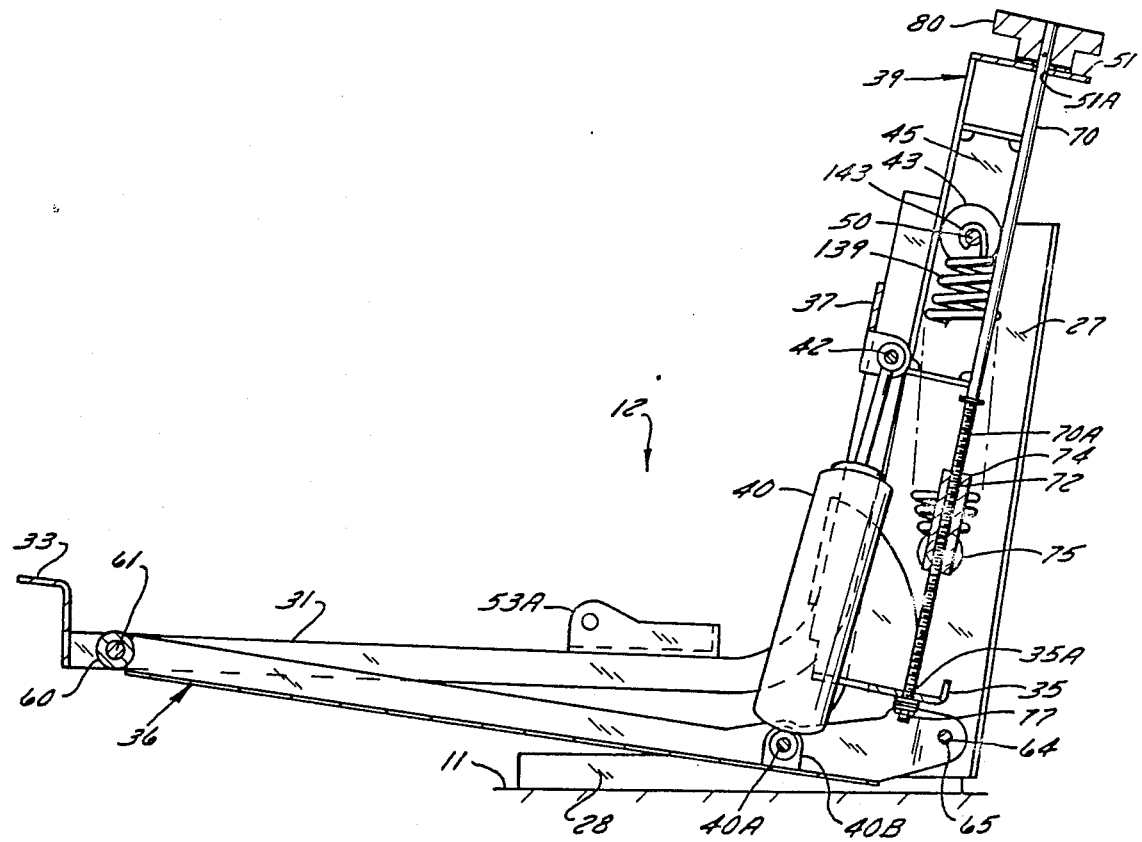
FIG. 4 is an enlarged side elevation view of the frame assembly of FIG. 3 showing it fully assembled and in midride condition.
Figure 5:
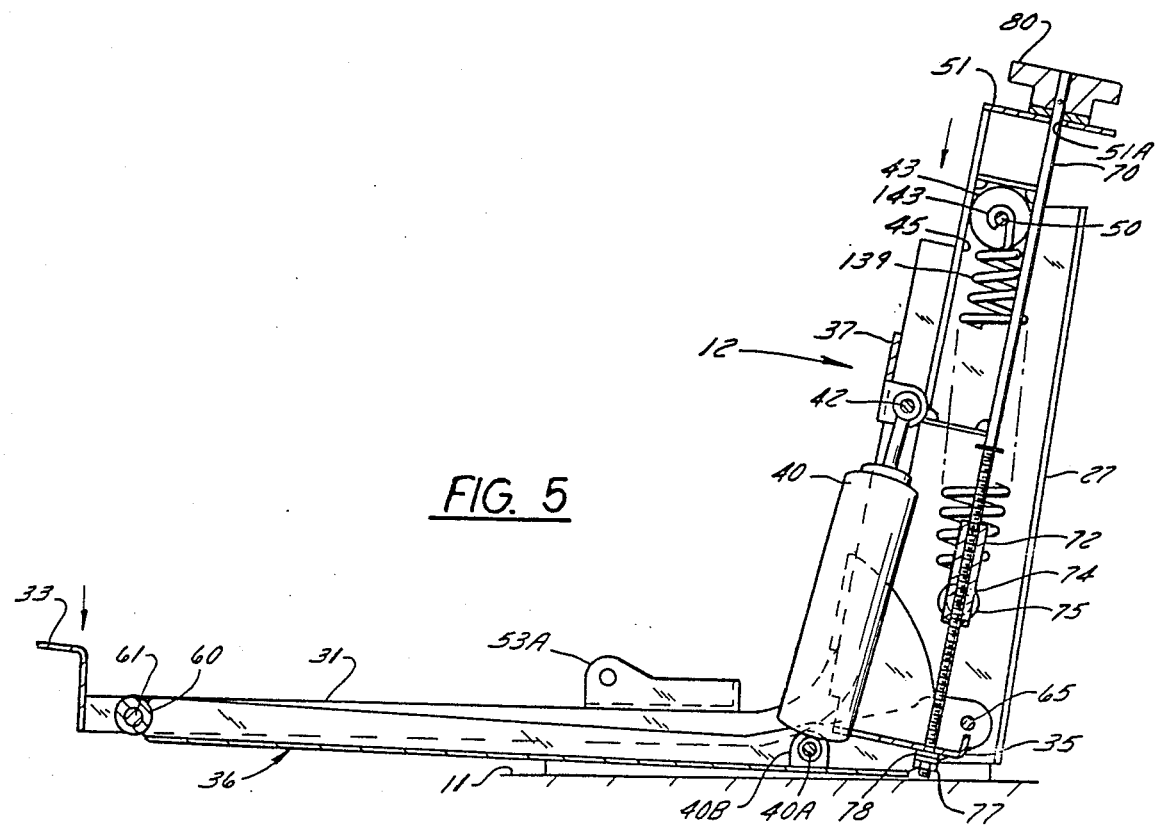
FIG. 5 is a view similar to FIG. 4 but showing the frame assembly in fully loaded condition.

A vertically disposed spring tension adjustment rod 70 is rotatably mounted in the holes 35A and 51A provided in spring shelf 35 and header plate 51, respectively. Rod 70 is threaded along its lower end as at 70A so as to threadedly engage a threaded hole 72 in a spring hanger 74 which is mounted on the lower end of adjustment rod 70. Each spring 139, 139A, which has its upper end 143 hooked to upper support rod 50 on support frame 26, has a lower end 75 which is hooked to the spring hanger 74. As FIGS. 3, 4 and 5 show, rod 70 has a nut 77 (and washers 78) on its lower end below spring shelf 35 and has an operating knob 80 on its upper end above header plate 51. This arrangement prevents axial movement of rod 70 but enables it to be rotated. Manual rotation of tension adjustment rod 70 moves spring hanger 74 axially therealong to load or relax the springs 139, 139A, depending on the direction of rotation.

OPERATION

FIG. 4 shows seat frame assembly 12 in a midride condition wherein it is assumed that the springs 139 and 139A have been pre-loaded to accommodate a seat occupant (not shown) of some predetermined weight who is understood to occupy seat frame 30 of seat 10. With these assumptions, the springs 139 and 139A are stretched and damper 40 is slightly extended, as shown in FIG. 4.

Now, when seat 10 and its occupant are subjected to a road shock, seat frame 30 initially is forcefully moved downwardly from the position shown in FIG. 4 to that shown in FIG. 5. As this occurs, the springs 139 and 139A stretch and damper 40 is correspondingly retracted. As the downward force is spent, the springs 139 and 139A retract to raise and return seat frame 30 to its normal pre-loaded position shown in FIG. 4. At the same time, damper 40 is again extended and, in doing so, dampens the action of the springs 139 and 139A.

Such downward and upward movement of seat frame 30 relative to support frame 26 occurs in response to each road shock and the extent of relative travel of seat frame 30 is a function of the force of the shock.

In order to adjust the amount of pre-load on the springs 139 and 139A, either to accommodate the weight of the seat occupant and/or to provide for a "soft" or "hard" ride, depending on the operator's choice, the operator manually rotates knob 80 to effect corresponding rotation of rod 70. As rod 70 rotates, spring hanger 74 is moved axially (downwardly or upwardly) along the rod and the springs 139 and 139A are stretched or relaxed, depending on the direction of rod rotation. When the springs are stretched during adjustment, more force is required to stretch them further in response to road shock and a "hard" ride results. Conversely, when the springs are relaxed during adjustment, less force is required to stretch them further in response to road shock and a "soft" ride results.

I claim:

1. A seat for a vehicle comprising:
   a stationary support frame for mounting on said vehicle;
   a movable seat frame for accommodating a seat occupant;
   means for mounting said movable seat frame on said stationary support frame to enable said movable seat frame to move vertically relative to said stationary support frame in response to road shocks or the weight of a seat occupant, said means comprising guide means including a first member mounted on and movable with said movable seat frame and a second member mounted on said stationary support frame and engaged with said first member, said means further comprising a swing arm pivotally connected between said stationary support frame and said movable seat frame;
   a helical tension spring having an upper end and a lower end for biasing said movable seat frame upwardly relative to said stationary support frame;
   first means for connecting said upper end of said tension spring to said stationary support frame;
   second means for connecting said lower end of said tension spring to said movable seat frame, said second means comprising a rod mounted on and movable with said movable seat frame, said second means further comprising a spring hanger mounted on and movable with said rod and engaged with said lower end of said tension spring, said spring hanger being selectively movable axially to desired positions along said rod to thereby adjust the tension on said spring;
   and extendable/retractable spring damper means connected in parallel with said tension spring between said movable seat frame and said swing arm.

2. A seat according to claim 1 wherein said rod is rotatable about its longitudinal axis, wherein said rod has a threaded portion and wherein said spring hanger has a threaded bore in which said threaded portion of said rod is engaged so that rotation of said rod effects axial movement of said spring hanger.

3. A seat according to claim 1 or 2 wherein, in said guide means of said means for mounting said movable seat frame on said stationary support frame, said second member and said first member, respectively, comprise:
   a roller rotatably mounted on said stationary support frame; and
   a roller guide mounted on said movable seat frame and in which said roller is engaged.

4. A seat comprising:
   a stationary support frame having a lower end and an upper end;
   a movable seat frame having a generally horizontal seat portion and a generally vertical backrest portion, said seat portion having a rear end and a front end, said backrest portion having a lower end and an upper end;
   means for mounting said movable seat frame on said stationary support frame to enable said movable seat frame to move generally vertically relative to said stationary support frame in response to forces imposed on said seat frame by road shocks or the weight of a seat occupant,
   said means comprising a roller rotatably mounted on said stationary support frame, said means further comprising a roller guide mounted on and movable with said movable seat frame and engaged with said roller,
   said means further comprising an elongated swing arm having a front end pivotally connected to the front end of said seat portion and having a rear end pivotally connected to the lower end of said stationary support frame;
   a helical tension spring for biasing said movable seat frame upwardly relative to said stationary support frame and having an upper end and a lower end;
   first means for connecting said upper end of said tension spring to the said stationary support frame near the upper end of the latter;
   second means for connecting said lower end of said tension spring to said movable seat frame near the rear end of said seat portion, said second means comprising a rod mounted on and movable with said movable seat frame, said second means further comprising a spring hanger mounted on and movable with said rod and engaged with said lower end of said tension spring;
   and extendable/retractable spring damping means having a lower end pivotally connected to said swing arm near the rear end thereof and having an upper end pivotally connected to said movable seat frame intermediately of the lower and upper ends of said backrest portion.

5. A seat according to claim 4 wherein said spring hanger is selectively movable axially to desired positions along said rod to thereby adjust the tension on said tension spring.

6. A seat according to claim 5 wherein said rod is rotatable about its longitudinal axis, wherein said rod has a threaded portion and wherein said spring hanger has a threaded bore in which said threaded portion of said rod is engaged so that rotation of said rod effects axial movement of said spring hanger.

7. A seat according to claim 4 or 5 wherein said means for mounting said movable seat frame on said stationary support frame comprises a support rod mounted on said stationary support frame, wherein said roller is rotatable mounted on said support rod and wherein said first means for connecting said upper end of said tension spring includes said support rod.

8. A seat assembly according to claim 7 including a pair of said rollers, one on each end of said support rod, and further including a pair of said tension springs, each tension spring connected between said support rod and said spring hanger.

* * * * *